United States Patent Office 3,786,051
Patented Jan. 15, 1974

3,786,051
1-(PHENYL OR PYRIDYL)-1,3-DIHYDRO-2H-
1,4-BENZODIAZEPIN-2-ONES
Adolf Bauer, Ingelheim am Rhein, Karl-Heinz Weber,
Gau Algesheim, Peter Danneberg, Ockenheim, and
Klaus Minck, Gau Algesheim, Germany, assignors to
Boehringer Ingelheim GmbH, Ingelheim am Rhein,
Germany
No Drawing. Filed Apr. 10, 1972, Ser. No. 242,836
Claims priority, application Germany, Apr. 8, 1971,
P 21 17 438.9
Int. Cl. C07d 53/06
U.S. Cl. 260—239.3 D                         15 Claims

ABSTRACT OF THE DISCLOSURE

Compounds of the formula

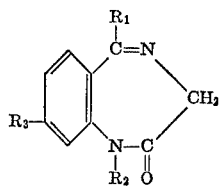

wherein $R_1$ is hydrogen or alkyl of 1 to 4 carbon atoms,
$R_2$ is phenyl, nitrophenyl, trifluoromethyl-phenyl, α-pyridyl or halogenophenyl, and
$R_3$ is halogen, nitro or trifluoromethyl;

the compounds are useful as psychosedatives and anticonvulsives.

---

This invention relates to novel 1-(phenyl or α-pyridyl)-1,3-dihydro-2H-1,4-benzodiazepin-2-ones, as well as to a process of preparing these compounds.

More particularly, the present invention relates to a novel class of 1,8-disubstituted and 1,5,8-trisubstituted 1,3-dihydro-2H-1,4-benzodiazepin-2-ones of the formula

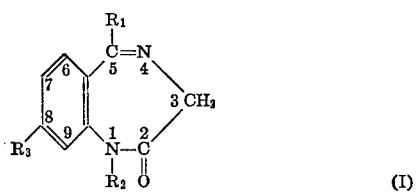

wherein $R_1$ is hydrogen or straight or branched alkyl of 1 to 4 carbon atoms,
$R_2$ is phenyl, nitrophenyl, trifluoromethyl-phenyl, α-pyridyl or halogenophenyl, and
$R_3$ is halogen, nitro or trifluoromethyl.

The compounds embraced by Formula I may be prepared by arylating or heteroarylating an 8-substituted or 5,8-disubstituted 1,3 - dihydro-2H-1,4-benzodiazepin-2-one of the formula

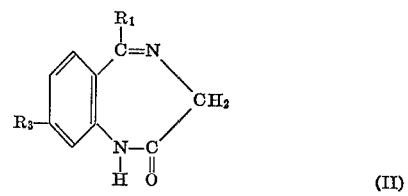

wherein $R_1$ and $R_3$ have the same meanings as in Formula I, with an aryl halide of the formula $$R_2—X \quad (III)$$

wherein $R_2$ has the same meanings as in Formula I and X is halogen

The arylation reaction is carried out in the presence of copper and an alkali metal acetate by heating the reaction mixture, optionally in an autoclave. Of advantage is the addition of a copper-(I)-salt, copper oxide, a weak organic base, such as pyridine, and/or a solvent which is inert toward the reactants, such as xylene, diethyleneglycol dimethylether, dimethylformamide or dimethylacetamide, to the reaction mixture.

In this manner the following end products of the Formula I may be obtained:

8-chloro-5-methyl-1-phenyl-1,3-dihydro-2H-1,4-
  benzodiazepin-2-one,
8-chloro-5-methyl-1-(o-fluorophenyl)-1,3-dihydro-2H-
  1,4-benzodiazepin-2-one,
5-ethyl-8-chloro-1-phenyl-1,3-dihydro-2H-1,4-
  benzodiazepin-2-one,
8-trifluoromethyl-1-(o-chlorophenyl)-5-methyl-1,3-
  dihydro-2H-1,4-benzodiazepin-2-one,
8-bromo-5-methyl-1-phenyl-1,3-dihydro-2H-1,4-
  benzodiazepin-2-one,
5-methyl-8-nitro-1-phenyl-1,3-dihydro-2H-1,4-
  benzodiazepin-2-one,
5-methyl-1-phenyl-8-trifluoromethyl-1,3-dihydro-2H-
  1,4-benzodiazepin-2-one,
5-ethyl-1-phenyl-8-trifluoromethyl-1,3-dihydro-2H-
  1,4-benzodiazepin-2-one,
8-chloro-1-phenyl-5-propyl-1,3-dihydro-2H-1,4-
  benzodiazepin-2-one,
8-chloro-5-isopropyl-1-phenyl-1,3-dihydro-2H-1,4-
  benzodiazepin-2-one,
5-n-butyl-8-chloro-1-phenyl-1,3-dihydro-2H-1,4-
  benzodiazepin-2-one,
8-chloro-5-methyl-1-(o-nitrophenyl)-1,3,-dihydro-
  2H-1,4-benzodiazepin-2-one,
8-chloro-5-methyl-1-(o-trifluoromethylphenyl)-1,3-
  dihydro-2H-1,4-benzodiazepin-2-one,
8-chloro-5-methyl-1-(α-pyridyl)-1,3-dihydro-2H-1,4-
  benzodiazepin-2-one,
8-chloro-5-isopropyl-1-(α-pyridyl)-1,3-dihydro-2H-
  1,4-benzodiazepin-2-one,
5-methyl-8-nitro-1-(α-pyridyl)-1,3-dihydro-2H-1,4-
  benzodiazepin-2-one,
8-bromo-5-methyl-1-(α-pyridyl)-1,3-dihydro-2H-1,4-
  benzodiazepin-2-one and
8-chloro-1-phenyl-1,3-dihydro-2H-1,4-benzodiazepin-
  2-one.

The starting compounds of the Formula II required for this process may, for example, be obtained by the method represented by the following schematic reaction sequence:

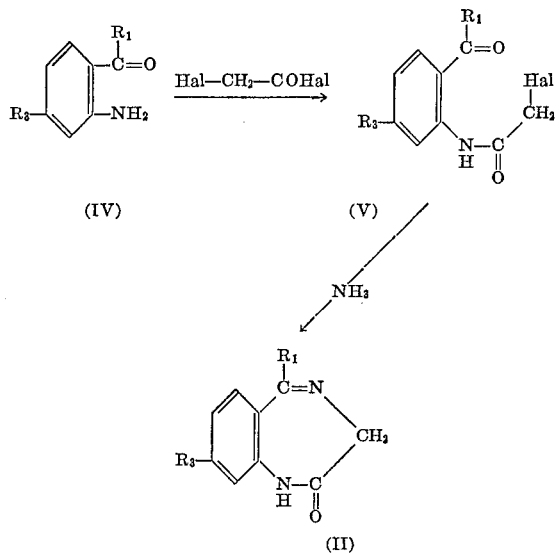

where $R_1$ and $R_3$ have the same meanings as in Formula I and Hal is halogen. In other words, a compound of the Formula IV is acylated with a conventional acylating agent, for example by heating the reactants in the presence of a base, the acylation product of the Formula V is dissolved in a suitable inert solvent, and ring closure is effected by addition of ammonia.

The following examples further illustrate the present invention and will enable others skilled in the art to understand it more completely. It should be understood, however, that the invention is not limited solely to the particular examples given below.

EXAMPLE 1

8-chloro-5-methyl-1-phenyl-1,3-dihydro-2H-1,4-benzodiazepin-2-one 10 gm. of copper powder, 10 gm. of potassium acetate and 35 gm. of bromobenzene were added to a solution of 10 gm. of 8-chloro-5-methyl-1,3-dihydro-2H-1,4-benzodiazepin-2-one in 100 ml. of dimethylacetamide, and the mixture was heated for 4 hours at 140° C. while vigorously stirring it. Thereafter, the reaction mixture was vacuum-filtered, the filter cake was washed with methylene chloride, and the solvents were evaporated from the filtrate in vacuo. The residue was stirred with 2 N hydrochloric acid, the insoluble matter was filtered off, and the filtrate was made alkaline with ammonia while cooling it on an ice bath. The precipitate formed thereby was collected by vacuum filtration, taken up in ethyl acetate, the solvent was evaporated, and the residue was caused to crystallize by addition of isopropyl ether, yielding 11.8 gm. (86% of theory) of the compound of the formula

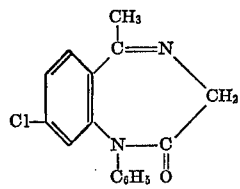

having a melting point of 171–172° C.

The starting compound was prepared as follows:

(a) 10 gm. of 2-amino-4-chloro-acetophenone were dissolved in a mixture of 100 ml. of absolute dioxane and 10 gm. of pyridine, and then a solution of 10 gm. of bromoacetyl bromide in 20 ml. of dioxane was added dropwise. The resulting mixed solution was heated for two hours at 45–50° C., the reaction mixture was worked up in conventional manner, and the reaction product was crystallized from isopropylether, yielding 98.9% of theory of 2 - bromoacetylamido - 4 - chloroacetophenone, M.P. 110–112° C.

(b) 10 gm. of 2 - bromoacetylamido - 4 - chloro-acetophenone were dissolved in 120 ml. of methanol, and the solution was admixed with a solution of 30 ml. of liquid ammonia in methanol. The resulting clear solution was allowed to stand for two hours at room temperature and was thereafter evaporated in vacuo, and the residue was crystallized from ethyl acetate/isopropylether, yielding 6.7 gm. (94% of theory) of 8-chloro-5-methyl-1,3-dihydro-2H-1,4-benzodiazepin-2-one, M.P. 203–204° C.

EXAMPLE 2

Using a procedure analogous to that described in Example 1, 8-chloro-5-methyl-1-(o-fluorophenyl)-1,3-dihydro-2H-1,4-benzodiazepin-2-one, M.P. 162–167° C., of the formula

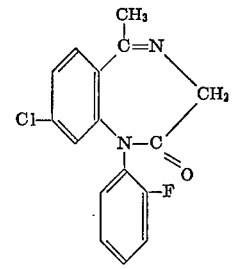

was prepared from 5-methyl-8-chloro-1,3-dihydro-2H-1,4-benzodiazepin-2-one and o-bromo-fluorobenzene.

EXAMPLE 3

Using a procedure analogous to that described in Example 1, 1-(α-pyridyl)-5-methyl-8-chloro-1,3-dihydro-2H-1,4-benzodiazepin-2-one, M.P. 146–148° C., of the formula

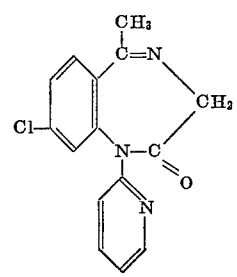

was prepared from 5-methyl-8-chloro-1,3-dihydro-2H-1,4-benzodiazepin-2-one and α-bromo-pyridine.

EXAMPLE 4

Using a procedure analogous to that described in Example 1, 1-(o-nitro-phenyl)-5-methyl-8-chloro-1,3-dihydro-2H-1,4-benzodiazepin-2-one, M.P. 176–178° C., of the formula

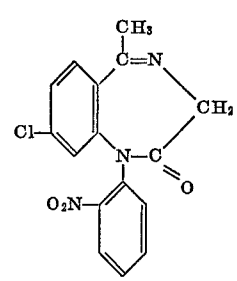

was prepared from 5-methyl-8-chloro-1,3-dihydro-2H-1,4-benzodiazepin-2-one and o-nitro-bromobenzene.

EXAMPLE 5

Using a procedure analogous to that described in Example 1, 1 - phenyl - 5-ethyl-8-chloro-1,3-dihydro-2H-1,4-benzodiazepin-2-one, M.P. 156–158° C., of the formula

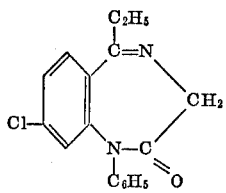

was prepared from 5-ethyl-8-chloro-1,3-dihydro-2H-1,4-benzodiazepin-2-one and bromobenzene.

EXAMPLE 6

Using a procedure analogous to that described in Example 1, 1-phenyl-5-methyl - 8 - trifluoromethyl-1,3-dihydro-2H-1,4-benzodiazepin - 2 - one, M.P. 133–135° C., of the formula

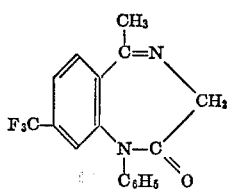

was prepared from 5-methyl-8-trifluoromethyl-1,3-dihydro-2H-1,4-benzodiazepin-2-one and bromobenzene.

EXAMPLE 7

Using a procedure analogous to that described in Example 1, 1-(o-trifluoromethyl-phenyl)-5-methyl-8-chloro-1,3-dihydro-2H-1,4-benzodiazepin-2-one, M.P. 138–141° C., of the formula

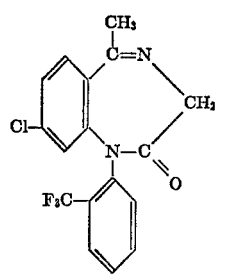

was prepared from 5-methyl-8-chloro-1,3-dihydro-2H-1,4-benzodiazepin-2-one and o-trifluoromethyl-bromobenzene.

EXAMPLE 8

Using a procedure analogous to that described in Example 1, 1-phenyl-5-ethyl-8-trifluoromethyl-1,3-dihydro-2H-1,4-benzodiazepin-2-one, M.P. 111–112° C., of the formula

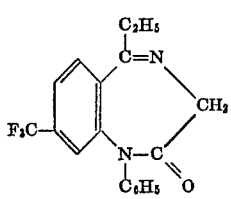

was prepared from 5-ethyl-8-trifluoromethyl-1,3-dihydro-2H-1,4-benzodiazepin-2-one and bromobenzene.

The compounds according to the present invention, that is, those embraced by Formula I above, have useful pharmacodynamic properties. More particularly, the compounds of the instant invention exhibit psychosedative (tranquilizing) and anticonvulsive activities in warm-blooded animals, such as mice, rats, dogs and minks. Particularly effective are those compounds of the Formula I wherein $R_1$ is alkyl of 1 to 4 carbon atoms,
$R_2$ is o-nitrophenyl, o-halogenophenyl or α-pyridyl, and
$R_3$ is halogen, nitro or trifluoromethyl, or wherein $R_1$ is alkyl of 1 to 4 carbon atoms,
$R_2$ is phenyl or o-trifluoromethyl-phenyl, and
$R_3$ is nitro.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective psychosedative and anticonvulsive dosage unit of the compounds according to the present invention is from 0.0083 to 0.84 mgm./kg. body weight, preferably 0.016 to 0.42 mgm./kg. body weight. The preferred daily dose rate is from 0.083 to 2.5 mgm./kg. body weight.

The following examples illustrate a few dosage unit compositions comprising a compound of the present invention as an active ingredient and represent the best mode contemplated of putting the invention into practical use. The parts are parts by weight unless otherwise specified.

EXAMPLE 9

Coated pills

The pill core composition is compounded from the following ingredients:

| | Parts |
|---|---|
| 8 - chloro - 5 - methyl-1-phenyl-1,3-dihydro-2H-1,4-benzodiazepin-2-one | 5.0 |
| Lactose | 28.5 |
| Corn starch | 15.0 |
| Gelatin | 1.0 |
| Magnesium stearate | 0.5 |
| Total | 50.0 |

Preparation: The benzodiazepinone compound, the lactose and the corn starch are intimately admixed with each other, the mixture is moistened with an aqueous 10% solution of the gelatin, and the moist mass is forced through a 1 mm.-mesh screen. The resulting granulate is dried at 40° C. and again passed through the screen, the dry granulate is admixed with the magnesium stearate, and the composition is compressed into 50 mgm.-pill cores which are subsequently coated with a thin shell consisting essentially of a mixture of sugar, titanium dioxide, talcum and gum arabic and finally polished with beeswax. Each coated pill contains 5 mgm. of the benzodiazepinone compound and is an oral dosage unit composition with effective tranquilizing and anticonvulsive action.

The same result is obtained when the above benzodiazepinone compound is replaced by an equal amount of 8 - chloro - 5 - methyl-1-(α-pyridyl)-1,3-dihydro-2H-1,4-benzodiazepin-2-one or 5-methyl-1-phenyl - 8 - trifluoromethyl-1,3-dihydro-2H-1,4-benzodiazepin-2-one.

EXAMPLE 10

Suppositories

The suppository composition is compounded from the following ingredients:

| | Parts |
|---|---|
| 8-bromo-5-methyl-1-phenyl - 1,3 - dihydro-2H-1,4-benzodiazepin-2-one | 5.0 |
| Suppository base (e.g. cocoa butter) | 1695.0 |
| Total | 1700.0 |

Preparation: The finely pulverized benzodiazepinone compound is blended with the aid of an immersion homogenizer into the suppository base which had previously been melted and cooled to 40° C. 1700 mgm.-portions of the composition are then poured at 35° C. into cooled suppository molds and allowed to cool therein. Each suppository contains 5 mgm. of the benzodiazepinone compound and is a rectal dosage unit composition with effective tranquilizing and anticonvulsive action.

The same result is obtained when an equal amount of 5-methyl-8-nitro-1-phenyl - 1,3 - dihydro-2H-1,4-benzodiazepin-2-one is substituted for the benzodiazepinone compound in the above suppository composition.

Analogous results are obtained when any one of the other benzodiazepinones embraced by Formula I is substituted for the particular benzodiazepinone in Examples 9 and 10. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

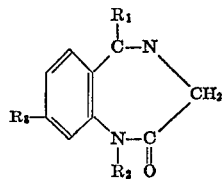

wherein
$R_1$ is hydrogen or alkyl of 1 to 4 carbon atoms,
$R_2$ is phenyl, nitrophenyl, trifluoromethyl-phenyl, α-pyridyl or halogenophenyl, and
$R_3$ is halogen, nitro or trifluoromethyl.
2. A compound according to claim 1,
wherein
$R_1$ is alkyl of 1 to 4 carbon atoms,
$R_2$ is o-halogenophenyl, o-nitrophenyl or α-pyridyl, and
$R_3$ is halogen, nitro or trifluoromethyl.
3. A compound according to claim 1,
wherein
$R_1$ is alkyl of 1 to 4 carbon atoms,
$R_2$ is phenyl or o-trifluoromethyl-phenyl, and
$R_3$ is nitro.
4. The compound according to claim 1, which is 8-chloro-5-methyl-1-phenyl-1,3-dihydro-2H - 1,4-benzodiazepin-2-one.
5. The compound according to claim 1, which is 8-bromo-5-methyl-1-phenyl-1,3-dihydro - 2H - 1,4-benzodiazepin-2-one .
6. The compound according to claim 1, which is 8-nitro-5-methyl-1-phenyl - 1,3 - dihydro-2H-1,4-benzodiazepin-2-one.
7. The compound according to claim 1, which is 8-trifluoromethyl-5-methyl-1-phenyl-1,3-dihydro-2H - 1,4-benzodiazepin-2-one.
8. The compound according to claim 1, which is 8-chloro - 5 - methyl-1-(o-nitrophenyl)-1,3-dihydro-2H-1,4-benzodiazepin-2-one.
9. The compound according to claim 1, which is 8-chloro-5-methyl-1-α-pyridyl - 1,3 - dihydro-2H-1,4-benzodiazepin-2-one.
10. The compound according to claim 1, which is 8-bromo-5-methyl-1-α-pyridyl - 1,3 - dihydro-2H-1,4-benzodiazepin-2-one.
11. The compound according to claim 1, which is 8-nitro-5-methyl-1-α-pyridyl - 1,3 - dihydro-2H-1,4-benzodiazepin-2-one.
12. The compound according to claim 1, which is 5-ethyl-8-chloro-1-phenyl - 1,3 - dihydro-2H-1,4-benzodiazepin-2-one.
13. The compound according to claim 1, which is 8-trifluoromethyl - 1 - (o-chlorophenyl)-5-methyl-1,3-dihydro-2H-1,4-benzodiazepin-2-one.
14. The compound according to claim 1, which is 8-chloro-5-methyl-1-(o - fluorophenyl)-1,3-dihydro-2H-1,4-benzodiazepin-2-one.
15. The compound according to claim 1, which is 8-chloro-1-phenyl-1,3-dihydro - 2H-1,4-benzodiazepin-2-one.

References Cited
FOREIGN PATENTS
1,145,471   3/1969   Great Britain ___ 260—239.3 D
1,918,905   10/1969  Germany _____ 260—239.3 D ALAN L. ROTMAN, Primary Examiner R. T. BOND, Assistant Examiner U.S. Cl. X.R.
424—244, 263